US012791058B2

(12) United States Patent
Ortiz Neri et al.

(10) Patent No.: US 12,791,058 B2
(45) Date of Patent: Nov. 10, 2026

(54) MAGNETIC THRUST BEARING WITH PUMPING EFFECT

(71) Applicant: Nuovo Pignone Tecnologie—S.r.l., Florence (IT)

(72) Inventors: Massimiliano Ortiz Neri, Florence (IT); Francesco Cangioli, Florence (IT); Davide Biliotti, Florence (IT); Duccio Fioravanti, Florence (IT)

(73) Assignee: Nuovo Pignone Tecnologie—S.R.L., Florence (IT)

( * ) Notice: Subject to any disclaimer, the term of this patent is extended or adjusted under 35 U.S.C. 154(b) by 213 days.

(21) Appl. No.: 18/700,988

(22) PCT Filed: Oct. 12, 2022

(86) PCT No.: PCT/EP2022/025470

§ 371 (c)(1),
(2) Date: Apr. 12, 2024

(87) PCT Pub. No.: WO2023/066517

PCT Pub. Date: Apr. 27, 2023

(65) Prior Publication Data

US 2024/0426341 A1 Dec. 26, 2024

(30) Foreign Application Priority Data

Oct. 19, 2021 (IT) ........................ 102021000026729

(51) Int. Cl.
*F16C 32/04* (2006.01)

(52) U.S. Cl.
CPC ................................ *F16C 32/0478* (2013.01)

(58) Field of Classification Search
CPC . F16C 32/0478; F16C 32/0406; F16C 37/005
See application file for complete search history.

(56) References Cited

U.S. PATENT DOCUMENTS

| | | | |
|---|---|---|---|
| 3,377,113 | A | 4/1968 | Wilson |
| 4,935,654 | A | 6/1990 | Glass et al. |

(Continued)

FOREIGN PATENT DOCUMENTS

| | | | |
|---|---|---|---|
| EP | 0317946 | A2 | 11/1989 |
| EP | 1905948 | A1 | 9/2006 |

(Continued)

OTHER PUBLICATIONS

"Driving Expander Technology", Atlas Copco Gas and Process Solutions.
Cryostar, "Ecochill".

*Primary Examiner* — Tulsidas C Patel
*Assistant Examiner* — Mohammed Ahmed Qureshi
(74) *Attorney, Agent, or Firm* — Paul Frank + Collins P.C.

(57) ABSTRACT

The magnetic thrust bearing has a rotor assembly comprising a thrust disk. The thrust disk is arranged to rotate around an axis (X) and to receive a cooling fluid at an inner area around the axis (X) and discharge it in an outer area around the periphery of the thrust disk. The thrust disk comprises a plurality of blades located at the periphery of the thrust disk that are configured to pump the fluid as a result of rotation of the rotor assembly, in order to avoid the use of an external blower or additional impeller to flow the cooling fluid and preferably to allow the cooling fluid recirculation in a closed loop configuration.

20 Claims, 5 Drawing Sheets

(56) References Cited

U.S. PATENT DOCUMENTS

| | | | | |
|---|---|---|---|---|
| 4,993,917 | A | 2/1991 | Kulle et al. | |
| 5,529,464 | A * | 6/1996 | Emerson | F04D 29/047 415/110 |
| 5,755,556 | A | 5/1998 | Hultgren et al. | |
| 6,132,094 | A | 10/2000 | Cornelison et al. | |
| 6,309,188 | B1 * | 10/2001 | Danner | H02K 7/083 417/423.12 |
| 9,234,522 | B2 | 1/2016 | Jonsson et al. | |
| 10,030,672 | B2 | 7/2018 | Gilarranz et al. | |
| 10,151,316 | B2 | 12/2018 | Camatti et al. | |
| 10,801,549 | B2 | 10/2020 | Ertas et al. | |
| 2011/0052432 | A1 * | 3/2011 | Cunningham | F04D 29/048 417/423.12 |
| 2013/0170943 | A1 | 7/2013 | Jonsson et al. | |
| 2018/0328210 | A1 | 11/2018 | Moll et al. | |
| 2019/0041124 | A1 | 2/2019 | Berti et al. | |
| 2019/0063257 | A1 | 2/2019 | Fioravanti et al. | |
| 2019/0331027 | A1 | 10/2019 | Fairman | |
| 2019/0368549 | A1 | 12/2019 | Ertas et al. | |

FOREIGN PATENT DOCUMENTS

| | | | |
|---|---|---|---|
| EP | 2447539 | A2 | 2/2012 |
| EP | 2 808 572 | A1 | 12/2014 |
| EP | 3450701 | A1 | 3/2019 |
| EP | 3467402 | A1 | 4/2019 |
| FR | 3 022 963 | A1 | 1/2016 |
| JP | H01190231 | A | 7/1989 |
| JP | H05 71533 | A | 3/1993 |
| JP | h0571533 | B2 | 10/1993 |
| JP | H0791760 | A | 4/1995 |
| JP | H11325092 | A | 11/1999 |
| JP | 2016522372 | A | 7/2016 |
| JP | 2017219246 | A | 12/2017 |
| JP | 7091760 | B2 | 6/2022 |
| KR | 20160011641 | A | 2/2016 |
| WO | 2017050445 | A1 | 3/2017 |
| WO | 2017153387 | A1 | 9/2017 |

* cited by examiner

MAGNETIC THRUST BEARING WITH PUMPING EFFECT

DESCRIPTION

Technical Field

The subject-matter disclosed herein relates to a magnetic thrust bearing cooled by a cooling fluid.

Background Art

Magnetic bearings are largely used for controlling the position of a rotor of a machine on which the magnetic bearing is installed due to several advantages including very low and predictable friction and the ability to run without lubrication and in vacuum. Typically, magnetic bearings are used in industrial machines such as compressors, turbines, pumps, motors and generators.

In particular, magnetic bearings can be Active Magnetic Bearing (=AMB) or Passive Magnetic Bearing (=PMB). A passive magnetic bearing uses permanent magnets to generate magnetic levitation; however, passive magnetic bearings are difficult to design. As a result, most magnetic bearings currently used in machines are active magnetic bearings.

In general, an active magnetic bearing is an electromagnetic system which has a stator with several electromagnets positioned around a rotor, which is typically coupled to a shaft; the electro-magnets of the stator generate attracting forces on the rotor in order to maintain the position of the rotor relative to the stator.

Currently, on rotary machines equipped with magnetic bearing, a cooling system is also provided in order to dissipate heat in the magnetic bearing, the cooling system including an external blower or additional impeller installed on the shaft of the rotary machine to circulate the cooling fluid. For example, EP3450701 and WO2017050445 disclose a turbomachine system that includes a cooling circuit coupled to active magnetic bearings which circulates a cooling fluid to remove heat therefrom. In EP3450701 the cooling fluid is recirculated by an additional impeller mounted on the machine shaft while in WO2017050445 the cooling fluid is circulated by an external blower.

Therefore, the rotary machine equipped with a magnetic bearing has to be provided with at least a dedicated component to allow the cooling flow circulation or recirculation.

SUMMARY

It would be desirable to have a cooled magnetic bearing which avoid the use of a dedicated component for the cooling flow circulation or recirculation, in order to reduce the number of the so-called "auxiliaries", i.e. auxiliary devoices, of the machine (and therefore to reduce electric energy to be supplied to the "auxiliaries") and in order to increase the machine availability.

According to an aspect, the subject-matter disclosed herein relates to a cooled magnetic thrust bearing having a rotor assembly comprising a thrust disk which is arranged to rotate around an axis and to receive a cooling fluid. The thrust disk comprises a plurality of blades that is configured to pump the fluid as a result of rotation of the rotor assembly in order to allow cooling fluid circulation, in particular cooling fluid recirculation in a closed loop configuration.

According to another aspect, the subject-matter disclosed herein relates to a rotary machine provided with a cooled magnetic thrust bearing wherein the rotor assembly of the cooled magnetic thrust bearing is coupled with a shaft of the rotary machine.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein.

DETAILED DESCRIPTION OF EMBODIMENTS

Figure 1:
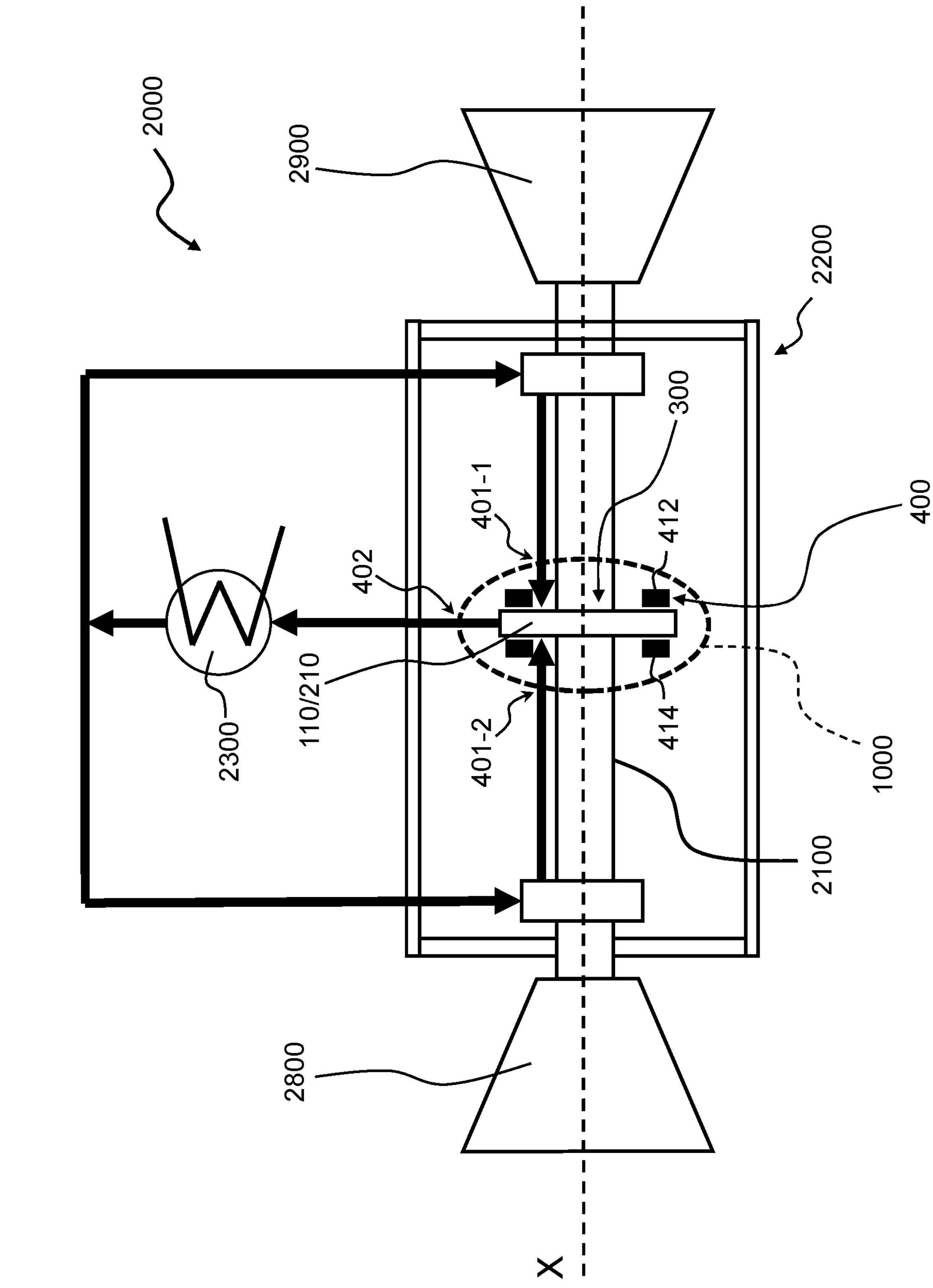
FIG. 1 shows a schematic and simplified cross-sectional view of an embodiment of a rotary machine, in particular an expander-compressor system, with an embodiment of an innovative magnetic thrust bearing.

The subject-matter disclosed herein relates to an innovative magnetic thrust bearing which is able due to its internal design to pump a cooling fluid without the need for an external blower or an additional impeller. In other words, the magnetic thrust bearing performs both its traditional thrust balancing function and its innovative cooling fluid pumping function.

According to a second aspect, the subject-matter disclosed herein relates to a rotating machine, in particular to a compressor or an expander-compression system. The rotating machine has a new magnetic thrust bearing in which the rotor assembly is integral with the shaft of the rotary machine. The shaft of the rotating machine is configured to rotate and the cooling fluid of the magnetic thrust bearing is pumped as a result of the rotation of the rotor assembly.

Reference now will be made in detail to embodiments of the disclosure, an example of which is illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. In the following description, similar reference numerals are used for the illustration of figures of the embodiments to indicate elements performing the same or similar functions. Moreover, for clarity of illustration, some references may be not repeated in all the figures.

According to a first aspect, the subject-matter disclosed herein relates to a rotary machine 2000 equipped with an innovative magnetic thrust bearing 1000; a simplified cross-sectional view of an embodiment of the machine is shown in FIG. 1. Advantageously, the rotary machine 2000 is an expander-compression system comprising an expander 2800, a compressor 2900 and a shaft 2100 mechanically coupling the expander 2800 and the compressor 2900. As it is apparent from FIG. 1, the compressor 2900 is arranged at a first end of the shaft 2100 and the expander 2900 is arranged at a second end of the shaft. In other embodiments, the rotary machine 2000 may be for example a compressor having a shaft which couples the compressor to a motor, in particular an electric motor.

FIG. 1 schematically shows the magnetic thrust bearing 1000 including a rotor assembly 300 and a stator assembly 400. As shown in the figure, all these elements may be housed in a casing 2200 of the rotary machine 2000. The rotor assembly 300 (including a thrust disk 110/210 that will be described later) is configured to rotate around an axis X; in particular, the rotor assembly 300 may be integral with the shaft 2100 of the rotary machine 2000 or may be coupled, in particular welded, to the shaft 2100 of the rotary machine 2000; more advantageously, the axis X of the rotor assembly 300 is also the axis of the shaft 2100 of the rotary machine 2000. In other words, the rotor assembly 300 is configured to rotate (including the thrust disk) together with the rotor of the rotary machine for example as it may be part of the rotor of the rotary machine 2000, in particular of the shaft 2100. For example, FIG. 2 shows a partial cross-sectional view of the rotor magnetic thrust bearing 1000 which is coupled with the shaft 2100.

Figure 2:
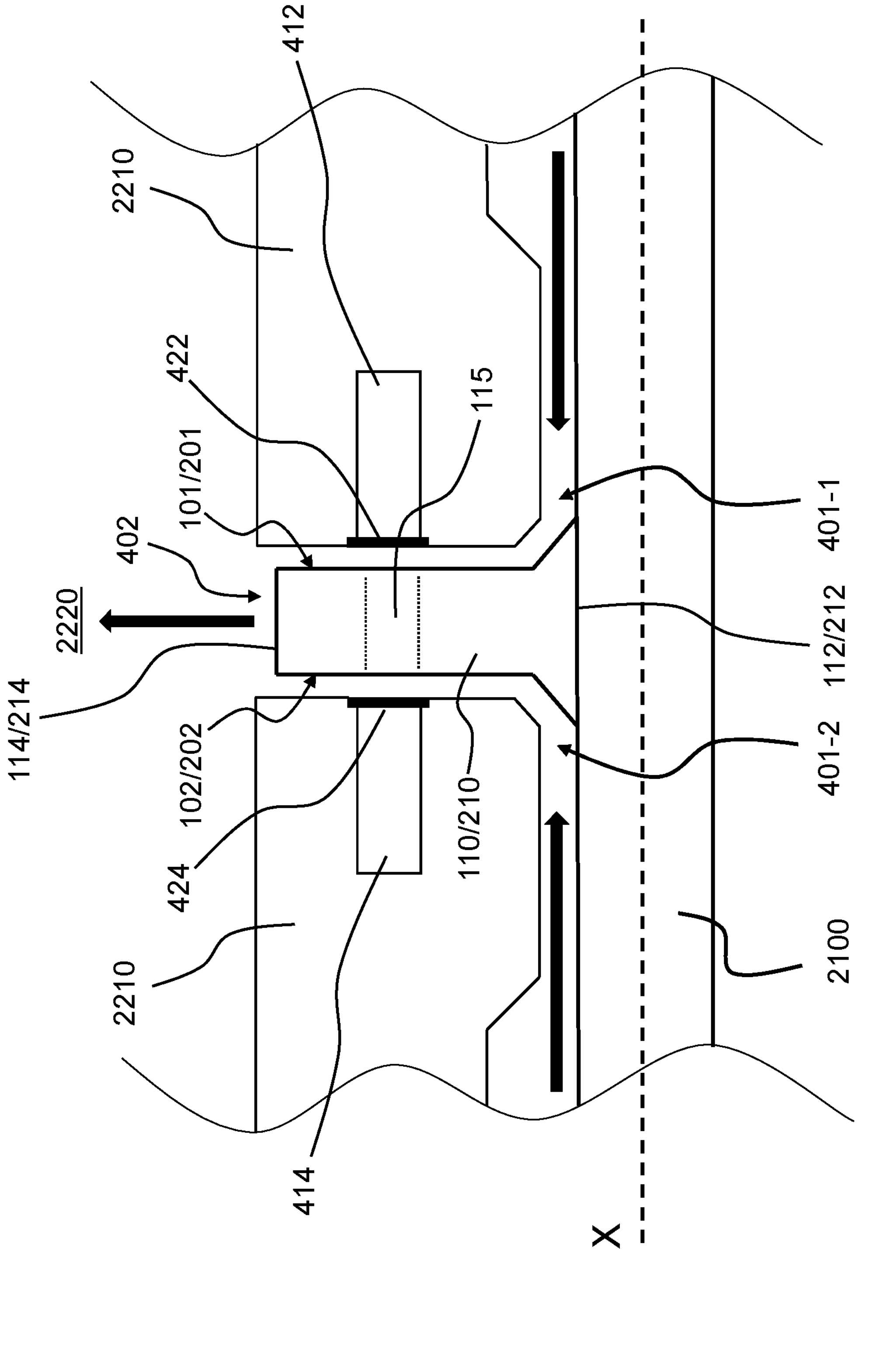
FIG. 2 shows a more detailed view of a partial cross-section of a magnetic thrust bearing coupled with the rotary machine of FIG. 1.

With non-limiting reference to FIG. 1 and FIG. 2 as well as FIG. 3 and FIG. 4, the rotor assembly 300 comprises a thrust disk 110/210 (110 in FIGS. 3 and 210 in FIG. 4) configured to rotate around the axis X, in particular to rotate together with the shaft 2100 of the rotary machine 2000. The thrust disk 110/210 has a first side 101/201 and a second side 102/202; in particular, the first side 101/201 faces the first end of the shaft 2100 and the second side 102/202 faces the second end of the shaft 2100, in such a way that the thrust disk 110/210 is arranged at an intermediate portion with respect to the two ends of the shaft 2100, preferably in the middle of a shaft length.

Typically, the thrust disk 110/210 has an inner periphery 112/212 and an outer periphery 114/214; advantageously, the inner periphery 112/212 is arranged to be coupled with the shaft 2100 of the rotary machine 2000. It is to be noted that the thickness of the thrust disk 110/210 may vary between the inner periphery 112/212 and the outer periphery 114/214; for example, the thickness of the thrust disk 110/210 may be greater at the inner periphery 112/212 than the thickness of the thrust disk 110/210 at the outer periphery 114/214. According to an advantageous embodiment that is similar to the one in FIG. 2, the thrust disk 110/210 may have:

- a first portion, which starts at the inner periphery 112/212 of the disk, which is coupled to the shaft 2100, and which has a greatest thickness at the inner periphery 112/212; preferably, the thickness of the first portion is gradually reduced from the greatest thickness to a first reduced thickness;
- a second portion, which has constant thickness; preferably, the constant thickness of the second portion is equal to the first reduced thickness of the first portion;
- a third portion 115/215 (that will be referred in the following also as "intermediate region"), in which the thickness starts from the constant thickness of the second portion and is gradually reduced; in other words, the thickness of the third portion is gradually reduced from the constant thickness of the second portion to a second reduced thickness; and
- a fourth portion, which starts at the outer periphery 114/214 of the disk and which has constant thickness; preferably, the constant thickness of the fourth portion is equal to the second reduced thickness of the third portion.

According to the embodiment of FIG. 1 and FIG. 2, the stator assembly 400 comprises at least two magnet assemblies 412 and 414, a first magnet assembly 412 facing the first side 101/201 of the thrust disk 110/210 and a second magnet assembly 414 facing the second side 102/202 of the thrust disk 110/210; preferably, the magnet assemblies 412 and 414 are ring-shaped; more preferably, the magnet assemblies 412, 414 are arranged around the axis X.

With non-limiting reference to FIG. 2, the stator assembly 400 is fixed to wall that may be an inner wall 2210 of the casing 2200 of the rotary machine 2000. In particular, the stator assembly 400 may be embedded in the wall such that a side of the magnet assemblies 412 and 414 faces the thrust disk 110/210. Advantageously, there is a gap between the rotor assembly 300 and the stator assembly 400. More advantageously, the side of magnet assemblies 412 and 414 which faces the thrust disk 110/210 has a protective plate 422 and 424, in particular made of bakelite, to protect the magnet assemblies 412 and 414 for example from wear and/or corrosion and/or heat.

Considering FIG. 1 and FIG. 2, the magnetic thrust bearing 1000 has at least a fluid inlet and a fluid outlet and is configured to be cooled by a fluid, in particular a gas. At least the first side 101/201 of the thrust disk 110/210, preferably both the first side 101/201 and the second side 102/202 of the thrust disk 110/210, is configured to receive the fluid. Preferably, the magnetic thrust bearing 1000 has a first fluid inlet 401-1 for the fluid entering at the first side 101/201 of the thrust disk 110/210 and a second fluid inlet 401-2 for the fluid entering at the second side 102/202 of the thrust disk 110/210 (see the two horizontal arrows in FIG. 2). Preferably, the fluid outlet 402 is at the outer periphery 114/214 of the thrust disk 110/210. (see e.g. the vertical arrow in FIG. 2).

The magnetic thrust bearing 1000 is configured to be cooled by the fluid which enters into the fluid inlets 401-1 and 401-2, flows from the fluid inlets 401-1 and 401-2 to the fluid outlet 402, and exits from the fluid outlet 402, in particular at a higher temperature with respect to the fluid temperature at the fluid inlets 401-1 and 401-2; advantageously, the fluid may be a working fluid of the rotating machine (i.e. process gas). It is to be noted that if the process gas composition contains contaminants, like $H_2S$, $CO_2$, etc., the so-called "instrument air", which is typically easily procurable and available in industrial plants (for example for pneumatic equipment or valve actuation), may be used.

Advantageously, the fluid enters the casing 2200 of the rotary machine 2000, preferably through at least an inlet flange, flows substantially in axial direction (i.e. parallel to the axis X as shown for example in FIG. 1 and FIG. 2), preferably in a gap between the shaft 2100 and an inner wall of the casing 2200 of the rotary machine 2000 and enters the magnetic thrust bearing 1000 through the fluid inlets 401-1 and 401-2, at the inner periphery 112/212 of the thrust disk 110/210, substantially in axial direction (see FIG. 1 and even better in FIG. 2). After being cooled by the fluid, the magnetic thrust bearing 1000 is configured to discharge the fluid through the fluid outlet 402, at the outer periphery 114/214 of the thrust disk 110/210, substantially in radial direction (i.e. perpendicular to the axis X as shown for example in FIG. 1 and FIG. 2). Advantageously, the fluid outlet 402 of the magnetic thrust bearing 1000 is fluidly coupled with an inner chamber 2220 of the casing 2200; then the fluid exits the casing 2200, in particular the inner chamber 2220, preferably through an outlet flange. More advantageously, the fluid is arranged to flow in a closed-loop configuration, in particular comprising a cooling system coupled with the inlet flange and the outlet flange, and to be recirculated in the closed-loop configuration only by means of the magnetic thrust bearing 1000 thanks to its pumping effect, as it will be apparent from the following. With non-limiting reference to FIG. 1, the closed-loop configuration is arranged at least partially outside the casing 2200. Advantageously, the cooling system also comprises a heat exchanger 2300 configured to remove heat from the fluid being discharged from the fluid outlet 402.

In FIG. 3A, FIG. 3B, FIG. 4A and FIG. 4B are schematically shown two embodiments of the thrust disk 110 (in FIGS. 3) and 210 (in FIG. 4) of the innovative magnetic thrust bearing 1000 according to the present disclosure.

Figure 3B:
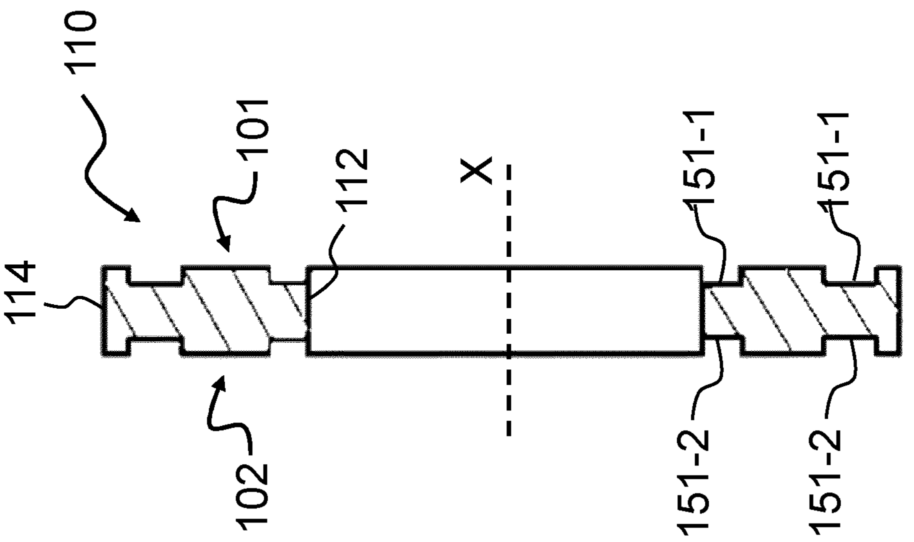
FIG. 3 show partially a front simplified view and a cross-section simplified view of a first embodiment (not totally covered by the annexed claims) of an innovative magnetic thrust bearing having a thrust disk with a plurality of grooves.
Figure 3A:
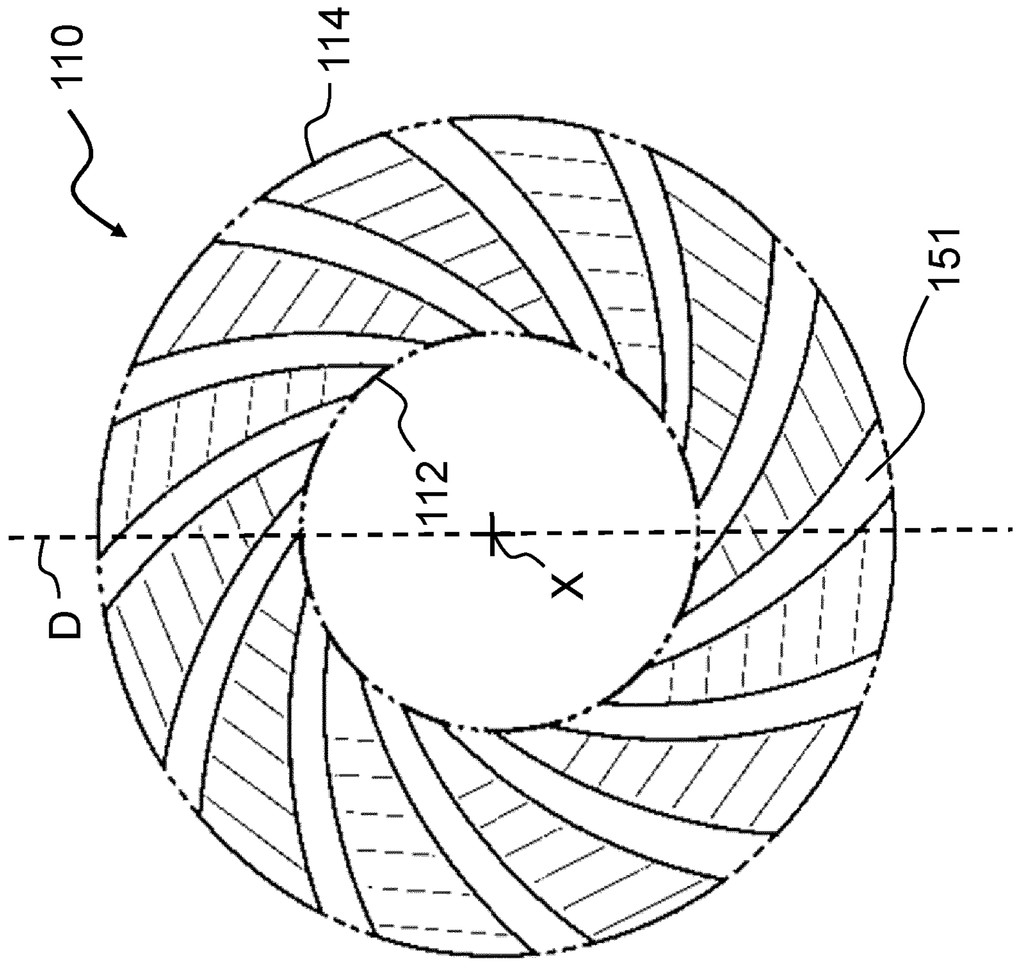

FIGS. 3A and 3B partially show, for example and without limitation, a first embodiment (not totally covered by the annexed claims) of a thrust disk 110 comprising a plurality of grooves configured to pump the fluid. FIG. 1A is a frontal schematic view of the thrust disk 110 and FIG. 1B is a cross-section schematic view of the thrust disk 110 of FIG. 1A taken along the dotted line.

Figure 4B:
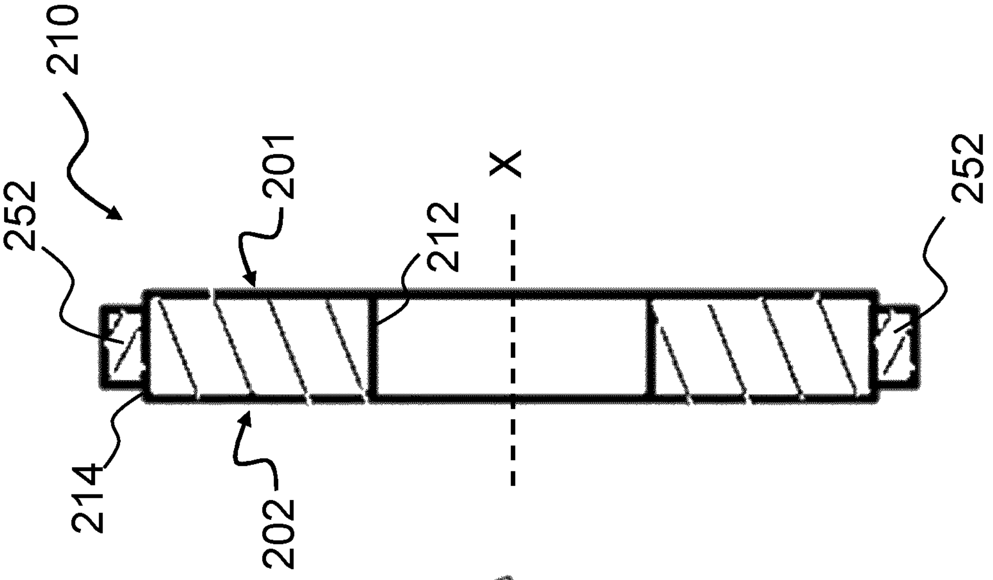
FIG. 4 show partially a front simplified view and a cross-section simplified view of a second embodiment of an innovative magnetic thrust bearing having a thrust disk with a plurality of blades.
Figure 4A:
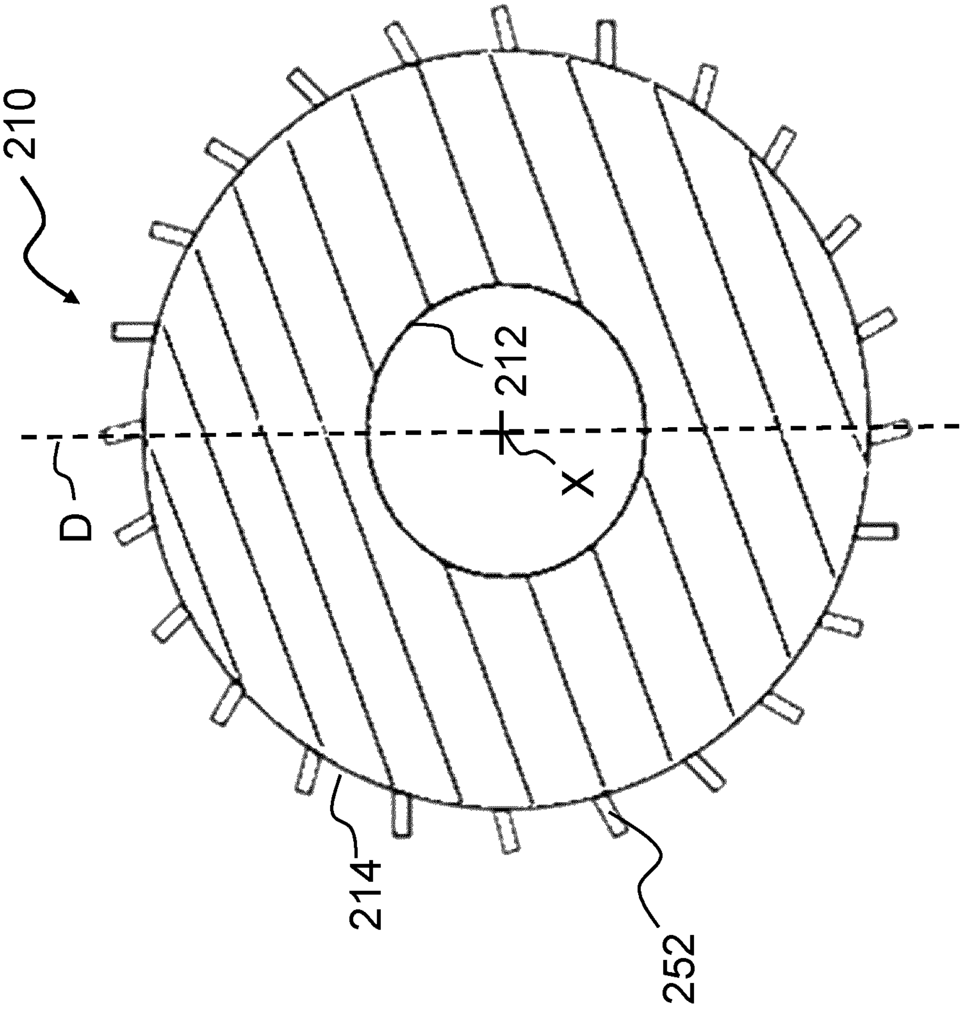

FIGS. 4A and 4B partially show, for example and without limitation, a second embodiment of a thrust disk 210 comprising a plurality of blades configured to pump the fluid. FIG. 4A is a frontal schematic view of the thrust disk 210 and FIG. 4B is a cross-section schematic view of the thrust disk 210 of FIG. 4A taken along the dotted line D.

According to the first embodiment, at least the first side 101 of the thrust disk 110 comprises a plurality of grooves 151 configured to pump the fluid as a result of the rotation of the rotor assembly 300 of the thrust magnetic bearing 1000. In a preferred embodiment (see FIG. 3B), the thrust disk 110 comprises a plurality of grooves 151-1 on the first side 101 and a plurality of grooves 151-2 on the second side 102, the grooves 151-1 and 151-2 being configured to pump the fluid as a result of rotation of the rotor assembly 300 of the thrust magnetic bearing 1000.

Advantageously, as shown in FIG. 3A and FIG. 3B, the grooves 151 extend from an area around the inner periphery 112 of the thrust disk 110 to an area around the outer periphery 114 of the thrust disk 110; in particular the grooves 151 extend continuously from an area around the inner periphery 112 of the thrust disk 110 to an area around the outer periphery 114 of the thrust disk 110. Alternatively, for example if the thrust disk 110 is made as the one shown in FIG. 2, the grooves 151 may extend from an area around the inner periphery 112 of the thrust disk 110 to an area around an intermediate region 115 of the thrust disk 110; in particular, the grooves 151 extend in a first constant thickness portion of the thrust disk 110. Alternatively or additionally, the grooves 151 may extend from an area around an intermediate region 115 of the thrust disk 110 to an area around the outer periphery 114 of the thrust disk 110; in particular, the grooves 151 extend in a second constant thickness portion of the thrust disk 110. It is to be noted that grooves 151 may be only on the first side 101 or on the second side 102 of the thrust disk 110 or alternatively grooves 151 may be on both the first and the second side of the thrust disk 110 (see for example the embodiment of FIG. 3B.

Advantageously, grooves 151 are curved-shaped; more advantageously, the grooves 151 are configured to define a preferential direction which may be followed by the fluid. It is to be noted that the width and/or the depth of the grooves 151 may not be constant: for example, the width at the area around the inner periphery 112 may be greater than the width at the area around the outer periphery 114. Advantageously, if the thrust disk 110 has grooves 151 both on the first side 101 and second side 102, the geometry of the grooves 151 is preferably the same both on the first side 101 and on the second side 102 of the thrust disk 110.

Advantageously, the fluid that enters the magnetic thrust bearing 1000 in order to cool it down flows on the thrust disk 110 from the area around the inner periphery 112 to the area around the outer periphery 114. More advantageously, most part of the fluid that flows on the thrust disk 110 is configured to flow in the preferential direction defined by the grooves 151; in other words, the fluid is guided to flow along the grooves 151 so that, with the rotation of the rotor assembly 300 due to the rotation of the shaft 2100, the grooves 151 are configured to pump the fluid. It is to be noted that the fluid that flows along the grooves 151 is subjected to the pumping effect of the thrust disk 110; generally, the fluid that flows outside the grooves 151 is not subjected to the pumping effect of the thrust disk 110.

Figure 5:
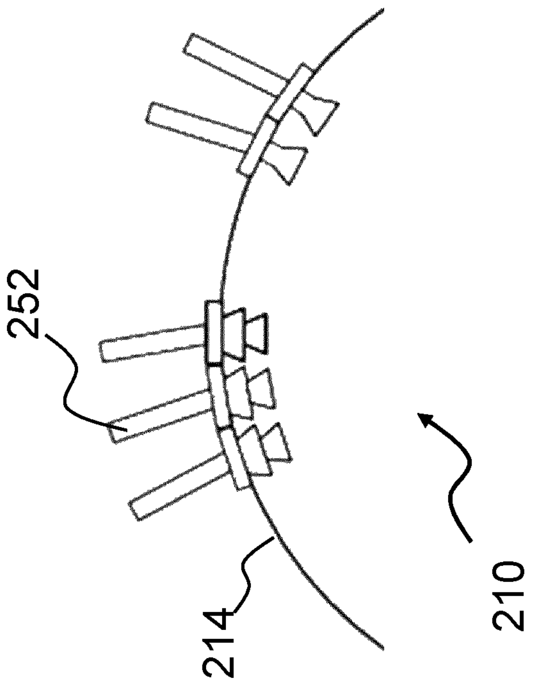
FIG. 5 shows a simplified sectional view of an example of joint which can be used to couple the plurality of blades to the thrust disk of the second embodiment of the innovative magnetic thrust bearing of FIG. 4.

According to the second embodiment shown in FIGS. 4, the thrust disk 210 comprises a plurality of blades 252 at the outer periphery 214 configured to pump the fluid as a result of the rotation of the rotor assembly 300 of the thrust magnetic bearing 1000. The blades 252 may be obtained directly from the thrust disk 210, by machining of the disk, or may be mounted on the thrust disk 210 by welding or joining. It is to be noted that if blades 252 are mounted on the thrust disk 210, they can be made of different material from the one of the thrust disk 210; for example, blades 252 may be made of composite materials. It is also to be noted that, if blades 252 are added by joining, known joint can be used. Preferably, according for example to FIG. 5, the blades 252 are mounted on the thrust disk 210 by dovetail coupling; in particular, in FIG. 5 are shown two possible couplings: a first group of blades have fir tree coupling and a second group of blades have dovetail coupling.

Advantageously, the blades 252 are smaller than the thrust disk 210; in particular, a height of the blades 252 might be in the range 5-15% of the diameter of the thrust disk 210 (measured at the outer periphery 214). Advantageously, a width of the blades 252 is less than or equal to the thickness of the thrust disk 210; preferably, the width of the blades 252 might be in the range 70-100% of the thickness of the thrust disk 210 (see for example FIG. 6).

Figure 6:
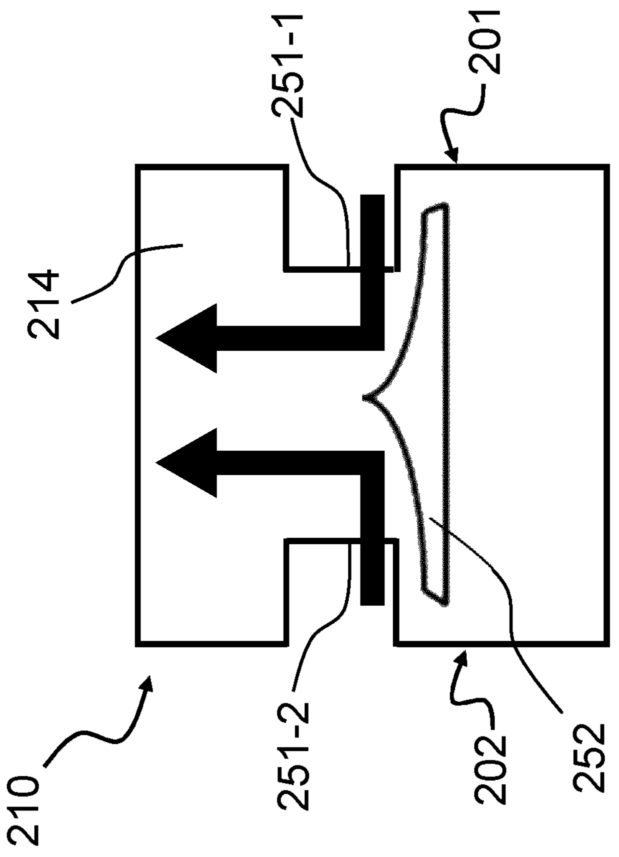
FIG. 6 shows a simplified partial top view of a third embodiment of an innovative magnetic thrust bearing having a thrust disk with a plurality of grooves and with a plurality of blades.

In another embodiment, shown in FIG. 6, the thrust disk 210 has both a plurality of grooves 251 and a plurality of blades 252. In particular, with non-limiting reference to FIG. 6, the thrust disk 210 has a plurality of grooves 251 on both side 201 and 202 of the thrust disk 210 and a plurality of blades 252 at its outer periphery 214. In particular, FIG. 6 is a simplified partial top view of the thrust disk 210 in which can be seen a first groove 251-1 on the first side 201 of the thrust disk 210 and a second groove 251-2 on the second side of the thrust disk 210; advantageously, the first groove 251-1 and the second groove 251-2 ends at the outer periphery 214 of the thrust disk 210. It is to be noted that the blade 252 may have a blade profile with two concavities, in particular with two edges with curved shape, for example to make the pumping effect on the fluid more effective and/or to help collect fluid at the thrust disk outer periphery 214; in particular, the blade 252 may have a first concavity oriented toward the first side 201 and a second concavity oriented towards the second side 202; preferably, the first and the second concavities of the blade 252 form a central ridge of the blade profile. Alternatively, the blade 252 may have two oblique edges with flat shape (i.e. without concavity), a first edge oriented toward the first side 201 and a second edge oriented towards the second side 202; preferably, the first and the second edges form a central ridge of the blade profile. According to FIG. 6, the fluid exits from the first and the second grooves 251-1 and 251-2 and flows on the blade 252 which pumps the fluid and exits the blade following the profile of the blade 252 (see the two big arrows in FIG. 6). It is to be noted that, with non-limiting reference to FIG. 6, the blade 252 is located at the outer periphery 214 of the thrust disk 210 where the ends of the first groove 251-1 and the second groove 251-2 end; advantageously, at least some of the plurality of blades 252 are located at the ends of at least some of the plurality of the grooves 251. It is also to be noted that the thrust disk 210 of FIG. 6 is rotating in the same direction of the exit direction of the fluid from the blade 252.

It is to be noted that the cross-section of the blade shown in FIG. 6 (or similar one with a first concavity oriented toward a first side and a second concavity oriented toward a second side) may advantageously be used in a thrust disk even not in combination with grooves in its surface or surfaces.

The invention claimed is:

1. A magnetic thrust bearing comprising:
- a rotor assembly configured to rotate, the rotor assembly comprising a thrust disk having a first side, a second side, and an outer periphery having blades disposed thereon; and
- a stator assembly comprising a first magnet assembly acting on the thrust disk,
- wherein the first side of the thrust disk is configured to receive cooling fluid, and an outer periphery of the thrust disk is configured to discharge the fluid,
- wherein the blades are configured to cause the cooling fluid to exit the rotor assembly in response to rotation of the thrust disk.

2. The magnetic thrust bearing of claim 1, further comprising:
- grooves disposed on the first side of the thrust disk,
- wherein the grooves are configured to cause the cooling fluid to exit the rotor assembly in response to of rotation of the thrust disk.

3. The magnetic thrust bearing of claim 1, further comprising:
- a second magnet assembly;
- a fluid inlet; and
- a fluid outlet,
- wherein the first magnetic assembly faces the first side of the thrust disk,
- wherein the second magnetic assembly faces the second side of the thrust disk,
- wherein the cooling fluid enters into the fluid inlet, flows from the fluid inlet to the fluid outlet, and exits from the fluid outlet,
- wherein at least the first side of the thrust disk is configured to receive the fluid at an inner periphery of the thrust disk, and discharge the fluid at the outer periphery of the thrust disk.

4. The magnetic thrust bearing of claim 1, further comprising:
- a first fluid inlet at the first side of the thrust disk; and
- a second fluid inlet at the second side of the thrust disk; and
- grooves disposed on both the first side and the second side of the thrust disk,
- wherein the grooves are configured to cause the cooling fluid to exit the rotor assembly in response to rotation of the thrust disk.

5. The magnetic thrust bearing of claim 1, further comprising:
- grooves disposed on the first side of the thrust disk,
- wherein the grooves extend from an area around an inner periphery of the thrust disk to an area around the outer periphery of the thrust disk.

6. The magnetic thrust bearing of claim 1, further comprising:
- grooves disposed on a side of the thrust disk,
- wherein the grooves have a first set that form at an inner area of the side and a second set that form at an outer area of the side.

7. The magnetic thrust bearing of claim 1, further comprising:
- grooves disposed on a side of the thrust disk,
- wherein the grooves are curved-shaped.

8. The magnetic thrust bearing of claim 1, further comprising:
- grooves disposed on a side of the thrust disk,
- wherein the grooves are configured so that at least part of the cooling fluid flows in a preferential direction defined by the grooves.

9. The magnetic thrust bearing of claim 1, wherein the blades extend away from the outer periphery of the thrust disc a height that is 5% to 15% of a diameter of the thrust disk.

10. The magnetic thrust bearing of claim 1, wherein a width of the blades is 70-100% of a thickness of the thrust disk.

11. The magnetic thrust bearing of claim 1, wherein the blades have a blade profile with a first concavity and a second concavity, wherein the first concavity is oriented toward the first side of the thrust disk and the second concavity is oriented toward the second side of the thrust disk.

12. The magnetic thrust bearing of claim 1, wherein the blades couple to the thrust disk with a dovetail coupling.

13. A rotary machine comprising the magnetic thrust bearing of claim 1.

14. An expander-compressor system comprising the magnetic thrust bearing of claim 1.

15. The expander-compressor system of claim 14, wherein the rotor assembly mounts to a shaft mechanically coupling an expander of the expander-compressor system and a compressor of the expander-compressor system.

16. The rotary machine of claim 13, further comprising:
- a casing,
- wherein the magnetic thrust bearing is positioned inside the casing, and
- wherein the fluid outlet of the magnetic thrust bearing is fluidly coupled with an inner chamber of the casing.

17. The rotary machine of claim 13, further comprising:
- a cooling system,
- wherein a fluid is recirculated in a closed loop configuration only by means of the magnetic thrust bearing.

18. The magnetic thrust bearing of claim 1, further comprising:

grooves disposed on the first side of the thrust disk,
wherein the grooves extend from an area around an inner periphery of the thrust disk to an area around an intermediate region of the thrust disk, or from an area around an intermediate region of the thrust disk to an area around the outer periphery of the thrust disk.

19. The magnetic thrust bearing of claim 1, further comprising:
grooves disposed on the first side of the thrust disk,
wherein the grooves extend from an area around an intermediate region of the thrust disk to an area around the outer periphery of the thrust disk.

20. The magnetic thrust bearing of claim 1, further comprising:
grooves disposed on both sides of the thrust disk,
wherein the grooves are curved-shaped.

* * * * *